United States Patent
Liu et al.

(10) Patent No.: US 7,781,017 B1
(45) Date of Patent: *Aug. 24, 2010

(54) METHOD FOR MAKING CARBON NANOTUBE-BASE DEVICE

(75) Inventors: Liang Liu, Beijing (CN); Shou-Shan Fan, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1096 days.

This patent is subject to a terminal disclaimer.

(21) Appl. No.: 11/416,724

(22) Filed: May 3, 2006

(30) Foreign Application Priority Data

Jul. 22, 2005 (CN) .................. 2005 1 0036148

(51) Int. Cl.
*C23C 16/00* (2006.01)
(52) U.S. Cl. .............. 427/249.1; 427/282; 977/840; 977/842; 977/843; 977/844
(58) Field of Classification Search .......... 427/249.1
See application file for complete search history.

(56) References Cited

U.S. PATENT DOCUMENTS

| | | | |
|---|---|---|---|
| 6,232,706 B1 * | 5/2001 | Dai et al. ............. | 313/309 |
| 6,297,592 B1 * | 10/2001 | Goren et al. .......... | 315/3.5 |
| 6,692,324 B2 * | 2/2004 | Simpson et al. ....... | 445/24 |
| 7,291,319 B2 * | 11/2007 | Liu et al. ............. | 423/447.2 |
| 2004/0136896 A1 * | 7/2004 | Liu et al. ............. | 423/447.3 |
| 2004/0191158 A1 * | 9/2004 | Liu et al. ............. | 423/447.3 |

OTHER PUBLICATIONS

Wang et al., Controllable preparation of patterns of aligned carbon nanotubes on metals and metal-coated silicon substrates, J. Mater. Chem, 2003, 12, 1124-1126.*
B. Q. Wei et al, Organized assembly of carbon nanotubes, Nature, Apr. 4, 2002, 495-496, vol. 416.
S. S. Fan et al, Self-oriented regular arrays of carbon nanotubes and their field emission properties, Science, Jan. 22, 1999, 512-514, vol. 283.
Z. F. Ren et al, Synthesis of large arrays of well-aligned carbon nanotubes on glass, Science, Nov. 6, 1998, 1105-1107, vol. 282.
Yoon-Taek Jang et al, Lateral growth of aligned mutilwalled carbon nanotubes under electric field, Solid State Communications, 2003, 305-308, vol. 126.
Ki-Hong Lee et al, Control of growth orientation for carbon nanotubes, Appl. Phys. Lett., Jan. 20, 2000, 448-450, vol. 82.

* cited by examiner

*Primary Examiner*—David Turocy
(74) *Attorney, Agent, or Firm*—Jeffrey T. Knapp

(57) ABSTRACT

A method for making a carbon nanotube-based device is provided. A substrate having a shadow mask layer to define an unmasked surface area thereon is provided. A sputter source is disposed on the shadow mask layer. The sputter source is configured for supplying a catalyst material and depositing the catalyst material onto the substrate. A catalyst layer including at least one catalyst block is formed on the substrate. A thickness of the at least one catalyst block is gradually decreased from one end to another opposite end thereof. The at least one catalyst block has a region with a thickness proximal or equal to an optimum thickness. A carbon source gas is introduced. At least one carbon nanotube array extending from the catalyst layer using a chemical vapor deposition process is formed. The at least one carbon nanotube array is arc-shaped, and bend in a direction of deviating from the region.

19 Claims, 6 Drawing Sheets

METHOD FOR MAKING CARBON NANOTUBE-BASE DEVICE

CROSS-REFERENCE TO RELATED APPLICATION

This application is related to one copending U.S. patent application Ser. No. 11/416,748 entitled "METHOD FOR MAKING CARBON NANOTUBE-BASED DEVICE", concurrently filed here with and having the same assignee as the instant application. The disclosure of the above-identified application is incorporated herein by reference.

TECHNICAL FIELD

The present invention generally relates to a method for making a carbon nanotube-based device.

BACKGROUND

Carbon nanotubes are very small tube-shaped structures essentially having the composition of a graphite sheet, formed as a tube. Carbon nanotubes produced by arc discharge between graphite rods were first discovered and reported in an article by Sumio Iijima entitled "Helical Microtubules of Graphitic Carbon" (Nature, Vol. 354, Nov. 7, 1991, pp. 56-58). Carbon nanotubes have very good electrical conductance due to their structure. They are also chemically stable, and have very small diameters (less than 100 nanometers) and large aspect ratios (length/diameter). Due to these and other properties, it has been suggested that carbon nanotubes can play an important role in fields such as microscopic electronics, materials science, biology and chemistry.

Although carbon nanotubes promise to have a wide range of applications, better control is needed over the building and organization of nanotube-based architectures. Normally, the orientation of growing nanotubes is controlled such that the nanotubes are rectilinear and parallel to each other. Chemical vapor deposition has been used to produce nanotubes vertically aligned on catalyst-printed substrates.

There have been reports of growth of aligned carbon nanotubes using chemical vapor deposition, for instance, Z. F. Ren et al. entitled "Synthesis of large arrays of well-aligned carbon nanotubes on glass" (Science, Vol. 282, Nov. 6, 1998, pp. 1105-1107), S. S. Fan et al. entitled "Self-oriented regular arrays of carbon nanotubes and their field emission properties" (Science, Vol. 283, Jan. 22, 1999, pp. 512-514), B. Q. Wei et al. entitled "Organized assembly of carbon nanotubes" (Nature, Vol. 416, Apr. 4, 2002, pp. 495-496), Yoon-Taek Jang et al. entitled "Lateral growth of aligned mutilwalled carbon nanotubes under electric field" (Solid State Communications, Vol. 126, 2003, pp. 305-308), and Ki-Hong Lee et al. entitled "Control of growth orientation for carbon nanotubes" (Appl. Phys. Lett., Vol. 82, Jan. 20, 2003, pp. 448-450).

However, carbon nanotubes obtained by the above-mentioned methods are aligned along a linear direction, and/or extend perpendicularly from the substrates. Furthermore, the method of using an external field such as an electric field or a magnetic field, to control a direction of growth of the carbon nanotubes is difficult to apply in generating localized complicated structures with plural orientations of the carbon nanotubes. Accordingly, the range of diversity of different kinds of carbon nanotube-based devices is limited.

What is needed is to provide a method for making a carbon nanotube-based device with plural orientations of carbon nanotubes.

SUMMARY

In a preferred embodiment, a method for making a carbon nanotube-based device is provided. The method includes the following steps of: providing a substrate having a shadow mask layer formed thereon, the shadow mask layer being configured for defining an unmasked surface area on the substrate; disposing a sputter source on the shadow mask layer, the sputter source being configured for supplying a catalyst material and depositing the catalyst material onto the substrate; forming a catalyst layer including at least one catalyst block on the unmasked surface area of the substrate, a thickness of the at least one catalyst block being gradually decreased from a first end thereof to an opposite second end thereof, and the at least one catalyst block having a region with a thickness proximal or equal to an optimum thickness at which carbon nanotubes growing fastest; introducing a carbon source gas; and forming at least one carbon nanotube array extending from the catalyst layer using a chemical vapor deposition process, wherein the at least one carbon nanotube array being arc-shaped, and bending in a direction of deviating from the region.

Theoretically, the growth rate of carbon nanotubes is associated with a thickness of the catalyst layer used to grow them on. Under certain conditions for growing carbon nanotubes by a chemical vapor deposition process, the carbon nanotubes grow fastest when the catalyst layer has a certain optimum thickness. In particular, when the thickness of the catalyst layer is greater than the optimum thickness, the thicker the catalyst layer, the slower the growth rate of carbon nanotubes; when the thickness of the catalyst layer is less than the optimum thickness, the thinner the catalyst layer, the slower the growth rate of carbon nanotubes. If the thickness of the catalyst layer is deliberately controlled, so that the thickness gradually varies from a first end to an opposite second end, and somewhere the catalyst layer has a thickness proximal or equal to the optimum thickness for growing carbon nanotube; additionally, carbon nanotubes have inherently strong Van der Waals force interactions therebetween. Thereby, a carbon nanotube-based device with plural orientations of carbon nanotubes is obtainable.

Other advantages and novel features will become more apparent from the following detailed description of embodiments when taken in conjunction with the accompanying drawings.

BRIEF DESCRIPTION OF THE DRAWINGS

The components in the drawings are not necessarily to scale, the emphasis instead being placed upon clearly illustrating the principles of the present method for making a carbon nanotube-based device. Moreover, in the drawings, like reference numerals designate corresponding parts throughout the several views.

The exemplifications set out herein illustrate at least one preferred embodiment, in one form, and such exemplifications are not to be construed as limiting the scope of the present method for making a carbon nanotube-base device in any manner.

DETAILED DESCRIPTION OF THE EMBODIMENTS

Embodiment 1

FIGS. 1-4 together illustrate successive stages in a process for forming a catalyst layer on a substrate, in accordance with the first embodiment.

Figure 1:
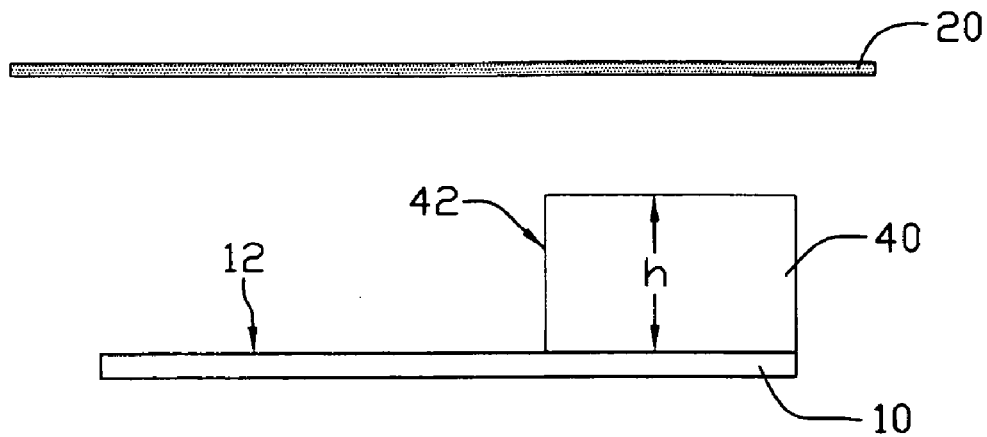
FIG. 1 is a schematic, cross-sectional view of one stage in a procedure for sputter-depositing a catalyst layer on a substrate in accordance with the first embodiment.

Referring to FIG. 1, a substrate 10 is first provided. Suitable substrate materials include a variety of materials, including metals, semiconductors and insulators such as silicon (Si), glass and metal sheets. It is possible that the substrate 10 will, in practice, be a portion of a device, e.g., a silicon-based integrated circuit device, on which nanotube formation is desired.

A shadow mask layer 40 is formed on the substrate 10 and located at one end portion thereof to define an unmasked surface area 12 of the substrate 10 to be exposed.

The shadow mask layer 40 is usually made from photoresist, metal, metallic oxide, or metallic nitride. The shadow mask layer 40 has a suitable height (as denoted by h in FIG. 1) to shade a sputter source 20 disposed above the shadow mask layer 40, in order to sputter-deposit a catalyst layer having a gradient thickness on the substrate 10. Advantageously, the shadow mask layer 40 has a plurality of sidewalls 42 substantially perpendicular to the substrate 10. The height of the shadow mask layer 40 is usually less than mean free path of a catalyst atom generated from the sputter source 20 under a predetermined sputter-deposition process. The mean free path S of a catalyst atom satisfies the condition (1):

$$S = \frac{kT}{\sqrt{2}\,\pi d^2 p} \tag{1}$$

where, d is a diameter of the catalyst atom, p is an operating pressure of the sputter-deposition process, k is the Boltzmann constant ($1.38066 \times 10^{-23}$ J/K (Joule per kelvin)), T is an operating absolute temperature of the sputter-deposition process. For example, when the T≈273.15 kelvin, p=1 pascal; the mean free path S of a catalyst iron atom is approximately equal to $13.5 \times 10^{-3}$ meters.

The sputter source 20 is configured for supplying a catalyst material and depositing the catalyst material onto the substrate 10, so as to form a catalyst layer having a gradient thickness via a sputter-deposition process. The catalyst material is usually selected from iron (Fe), cobalt (Co), nickel (Ni), or alloys thereof. Generally, a distance from the sputter source 20 to the substrate 10 is greater than the mean free path of a catalyst atom generated from the sputter source 20 under a predetermined sputter-deposition process. The sputter source 20 usually includes a surface sputter target made from a catalyst material, or a linear sputter target made from a catalyst material. In the case of the sputter source 20 having a linear sputter target, an optimum solution is that a reciprocating movement of the substrate 10 relative to the sputter source 20 along a direction perpendicular to the linear sputter target is implemented. In the illustrated embodiment, the sputter source 20 has a surface sputter target.

Figure 2:
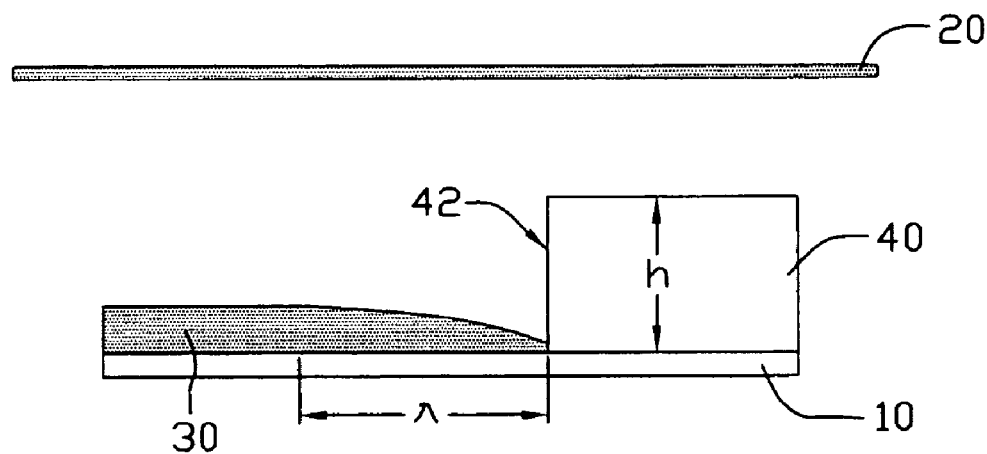
FIG. 2 is a schematic, cross-sectional view of a subsequent stage in a procedure for sputter-depositing a catalyst layer on the substrate of FIG. 1.

Referring to FIG. 2, due to the shading effect of the shadow mask layer 40 to the catalyst material generated from the catalyst source 20, a catalyst layer 30 having a gradient thickness is formed on the unmasked surface area 12 of the substrate 10 via a sputter-deposition process. The catalyst layer 30 is located at one side of the shadow mask layer 40. The catalyst layer 30 has a region with a thickness proximal or equal to, an optimum thickness at which carbon nanotubes growing fastest. A thickness of the catalyst layer 30 is gradually varied from one end thereof to another opposite end thereof.

Generally, a thickness T(λ) of a position of the catalyst layer 30 distant from the shadow mask layer 40 with a distance of λ approximately satisfies the following condition (2):

$$T(\lambda) = T_0/2 \times (1 + \lambda/\sqrt{\lambda^2 + h^2}) \tag{2}$$

where, $T_0$ is a thickness of the position under a situation that no shadow mask layer 40 exists on the substrate 10 during the sputter-deposition process; h is a height of the shadow mask layer 40.

It is realized from the condition (2) that an obvious gradient thickness exists in the region where λ varies from 0 to 2 h. The size of the region is correlated with the height of the shadow mask layer 40. For example, when the height h of the shadow mask layer 40 is in the range from 0.1 micrometers to 10 millimeters; correspondingly, the length (starting from the shadow mask layer 40) of the region having obvious gradient thickness is in the range from 0.2 micrometers to 20 millimeters In practice, the region having obvious gradient thickness usually fully covers a region used for growing carbon nanotubes of an expected carbon nanotube-base device.

Figure 3:
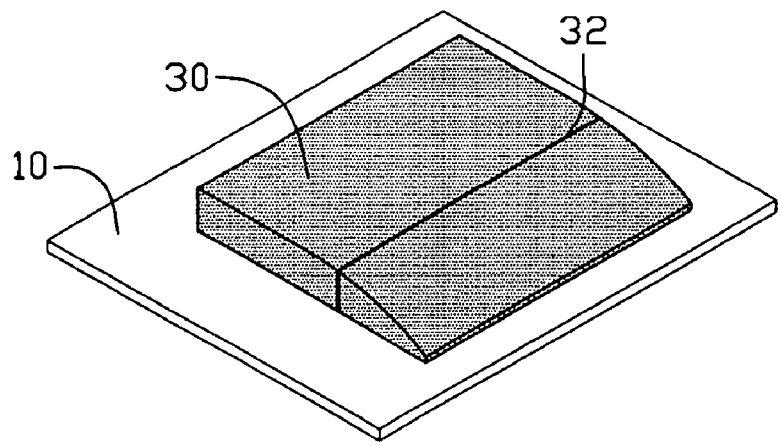
FIG. 3 is an isometric view of the substrate of FIG. 2 with the catalyst layer formed thereon, after the shadow mask layer being removed, and a region with a thickness proximal or equal to an optimum thickness at which carbon nanotubes growing fastest, of the catalyst layer being marked.

Referring to FIG. 3, the shadow mask layer 40 is removed from the substrate 10. A region 32 of the catalyst layer 30 is marked for purpose of determining the growth direction of carbon nanotubes. That is, under certain conditions for growing carbon nanotubes by a chemical vapor deposition process, the carbon nanotubes grow fastest at where a region of the catalyst layer 30 has an optimum thickness. If the conditions for growing the carbon nanotubes by the chemical vapor deposition process are predetermined, the optimum thickness can be determined accordingly. In the illustrated embodiment, as an example, the catalyst material is iron, a carbon source gas is ethylene, a temperature at which the carbon nanotubes are grown is about 700° C. (degrees Celsius). Accordingly, an optimum thickness of the catalyst layer 30 for growing carbon nanotubes is about 5 nm, i.e., the region 32 in this condition has a thickness proximal or equal to 5 nanometers.

Figure 4:
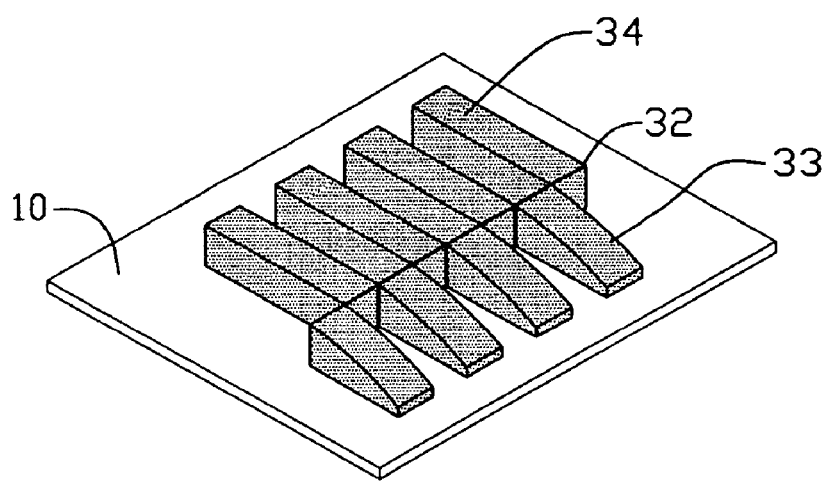
FIG. 4 is similar to FIG. 3, but showing the catalyst layer patterned into a plurality of catalyst blocks positioned at opposite sides of the region.

Referring to FIG. 4, the catalyst layer 30 can be patterned to meet various configurations of resultant carbon nanotube-based devices. The patterned catalyst layer 30 includes at least one catalyst block having a gradient thickness. In particular, a thickness of the at least one catalyst block gradually varies from a first end thereof to an opposite second end thereof. The least one catalyst block somewhere has a thickness proximal or equal to the optimum thickness for growing carbon nanotubes.

Advantageously, when the patterned catalyst layer 30 is made from iron, a thickness of the thickest end of each of the catalyst blocks is in the range from 5 nm to 20 nm, and a thickness of the thinnest end of each the catalyst blocks is in the range from 1 nm to 10 nm. In the illustrated embodiment, the patterned catalyst layer 30 includes a plurality of catalyst blocks 33, 34 staggeringly positioned at opposite sides of the region of optimum thickness 32. A thinnest end of each of the catalyst blocks 34 has a thickness approximately equal to the optimum thickness, and a thickest end of each of the catalyst blocks 33 has a thickness approximately equal to the optimum thickness. The pattern is defined using a photolithography process.

It is understood that, a catalyst layer having a predetermined pattern can be directly formed, without the patterning step as above-mentioned. The formation of such a catalyst layer is actually the product of a series of substeps. A shadow mask layer having a reverse pattern corresponding to the predetermined pattern is formed on the substrate 10, to define an unmasked surface area same to the predetermined pattern. After a catalyst layer sputter-deposition process similar to the process as above-mentioned being implemented, and the shadow mask layer being removed using a lift-off process, a catalyst layer having the predetermined pattern can be directly obtained.

Figure 5:
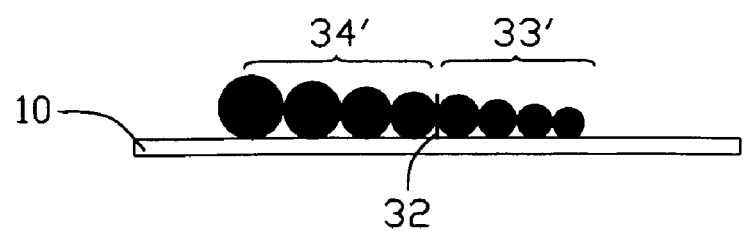
FIG. 5 is an enlarged, side view of the substrate and catalyst blocks of FIG. 4 after being annealed.
Figure 6:
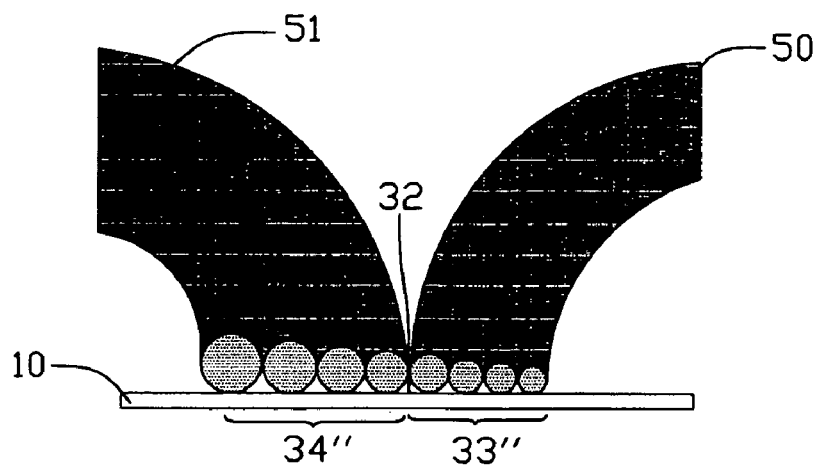
FIG. 6 is an enlarged, side view of a carbon nanotube-based device in accordance with the first embodiment, obtained by treating the catalyst blocks of FIG. 5.

FIGS. 5-6 together illustrate successive stages in a process for forming a carbon nanotube-based device with plural orientations of carbon nanotubes based on the above-described catalyst layer 30, in accordance with the first embodiment.

Referring to FIG. 5, the substrate 10 with the catalyst blocks 33, 34 is annealed in an oxygen-containing environment at about 300° C., thereby oxidizing the catalyst blocks 33, 34 to form nano-sized catalyst oxide particles 33', 34'. Consequently, the thinner a portion of the catalyst blocks 33, 34 is, the smaller the diameters of the catalyst oxide particles 33', 34' formed from that portion are. Likewise, the thicker a portion of the catalyst blocks 33, 34 is, the larger the diameters of the catalyst oxide particles 33', 34' formed from that portion are.

Subsequently, the treated substrate 10 is placed in a furnace (not shown), a carbon source gas is continuously introduced into the furnace, and then a chemical vapor deposition process similar to that of defining the region 32 of the catalyst layer 30 is implemented. In particular, the carbon source gas with a protective gas together are continuously introduced into the furnace at a predetermined temperature (e.g. 500~900° C.). The carbon source gas can be acetylene, ethylene, methane or any suitable carbon-containing gas. The protective gas can be a noble gas or nitrogen. The protective gas and carbon source gas are introduced at suitable flow rates respectively (e.g. 160 sccm and 80 sccm respectively).

Referring to FIG. 6, a plurality of carbon nanotube arrays 50, 51 extending from the substrate 10 can be formed. During the process of growing the carbon nanotube arrays 50, 51, the carbon source gas is decomposed into carbon atoms and hydrogen gas in a catalytic reaction process catalyzed by the nano-sized catalyst oxide particles 33', 34'. Thus the catalyst oxide particles 33', 34' are deoxidized to catalyst particles 33", 34" by the hydrogen gas. More detailed information on growth of a carbon nanotube array is taught in U.S. Pat. No. 6,232,706 entitled "Self-Oriented Bundles of Carbon Nanotubes and Method of Making Same," which is incorporated herein by reference. Due to inherently strong Van der Waals force interactions between the carbon nanotubes, the carbon nanotubes are bundled together, and the carbon nanotube arrays 50, 51 extend in arc shapes bending in directions deviating from the region of the optimum thickness 32.

Figure 7:
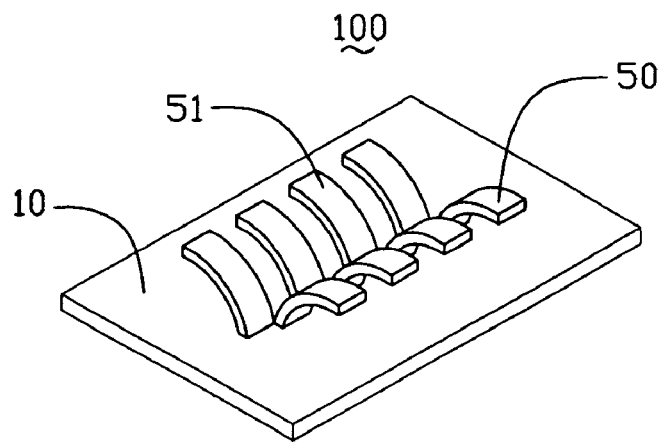
FIG. 7 is an isometric view of the carbon nanotube-based device of FIG. 6.

Referring to FIG. 7, a resultant carbon nanotube-based device 100 with plural orientations of the carbon nanotube arrays 50, 51 can be formed. The carbon nanotube-based device 100 includes the substrate 10, and a plurality of carbon nanotube arrays 50, 51 extending from the catalyst layer 30, supported by the substrate 10. The carbon nanotube arrays 50, 51 are arc-shaped, and bend in respective directions deviating from the region 32. In the illustrated embodiment, because the catalyst layer 30 only formed at one side of the shadow mask layer 40, so all the carbon nanotube arrays 50, 51 of the carbon nanotube-based device 100 totally extend along two different directions (as shown in FIG. 6).

Embodiment 2

FIGS. 8-12 together illustrate successive stages in a process for forming a catalyst layer on a substrate, in accordance with the second embodiment.

Figure 8:
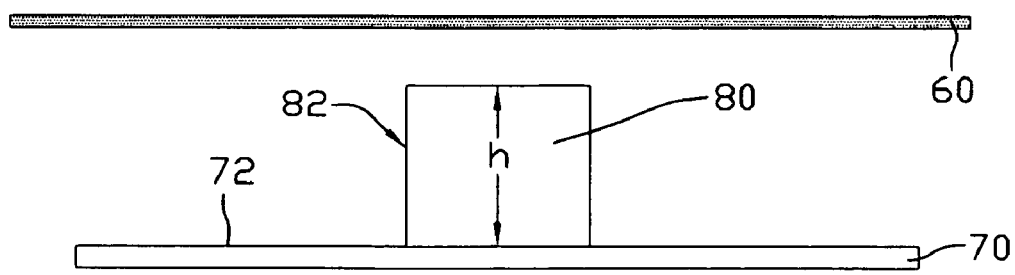
FIG. 8 is a schematic, cross-sectional view of one stage in a procedure for sputter-depositing a catalyst layer on a substrate in accordance with the second embodiment.

Referring to FIG. 8, a substrate 70 is first provided. Suitable substrate materials include a variety of materials, including metals, semiconductors and insulators such as silicon (Si), glass and metal sheets. It is possible that the substrate 70 will, in practice, be a portion of a device, e.g., a silicon-based integrated circuit device, on which nanotube formation is desired.

A shadow mask layer 80 is formed on the substrate 70 and located at a middle portion thereof, to define an unmasked surface area 72 of the substrate 70 to be exposed. The shadow mask layer 80 is usually made from photo-resist, metal, metallic oxide, or metallic nitride. The shadow mask layer 80 has a suitable height (as denoted by h in FIG. 7) to shade a sputter source 60 disposed on the shadow mask layer 80, in order to sputter-deposit a catalyst layer having a gradient thickness on the substrate 70. Advantageously, the shadow mask layer 80 has a plurality of sidewalls 82 substantially perpendicular to the substrate 70. The height of the shadow mask layer 80 is usually less than mean free path of a catalyst atom generated from the sputter source 60 under a predetermined sputter-deposition process. The mean free path (S) of a catalyst atom satisfies the condition (1) as the first embodiment described.

The sputter source 60 is configured for supplying a catalyst material and depositing the catalyst material onto the substrate 70, so as to form a catalyst layer having a gradient thickness via a sputter-deposition process. The catalyst material is usually selected from iron (Fe), cobalt (Co), nickel (Ni), or alloys thereof. Generally, a distance from the sputter source 60 to the substrate 70 is greater than the mean free path of a catalyst atom generated from the sputter source 60 under a predetermined sputter-deposition process. The sputter source 60 usually includes a surface sputter target made from a catalyst material, or a linear sputter target made from a catalyst material. In the case of the sputter source 60 having a linear sputter target, an optimum solution is that a reciprocating movement of the substrate 70 relative to the sputter source 60 along a direction perpendicular to the linear sputter target is implemented. In the illustrated embodiment, the sputter source 60 has a surface sputter target.

Figure 9:
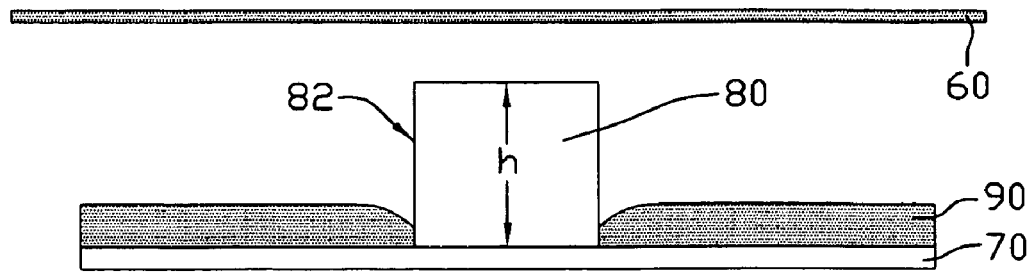
FIG. 9 is a schematic, cross-sectional view of a subsequent stage in a procedure for sputter-depositing a catalyst layer on a substrate of FIG. 8.

Referring to FIG. 9, a catalyst layer 90 having a gradient thickness is formed on the unmasked surface area 72 of the substrate 70, via a sputter-deposition process. The catalyst layer 90 is located around the shadow mask layer 80, and has a region with a thickness proximal or equal to an optimum thickness at which carbon nanotubes growing fastest. A thickness of the catalyst layer 90 is gradually varied from one end thereof to another opposite end thereof.

Generally, a thickness $T(\lambda)$ of a position of the catalyst layer 90 distant from the shadow mask layer 80 with a distance of $\lambda$ approximately satisfies the condition (2) as the above-described. It is realized from the condition (2) that an obvious gradient thickness exists in the region where $\lambda$ varies from 0 to 2 h; and the size of the region is correlated with the height of the shadow mask layer 80. In practice, the region having obvious gradient thickness usually fully covers a region used for growing carbon nanotubes of an expected carbon nanotube-base device.

Figure 10:
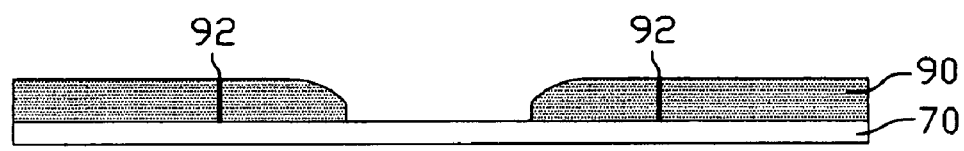
FIG. 10 is a schematic, cross-sectional view of the substrate of FIG. 9 with the catalyst layer formed thereon, after the shadow mask layer being removed, and a region with a thickness proximal or equal to an optimum thickness at which carbon nanotubes growing fastest, of the catalyst layer being marked.
Figure 11:
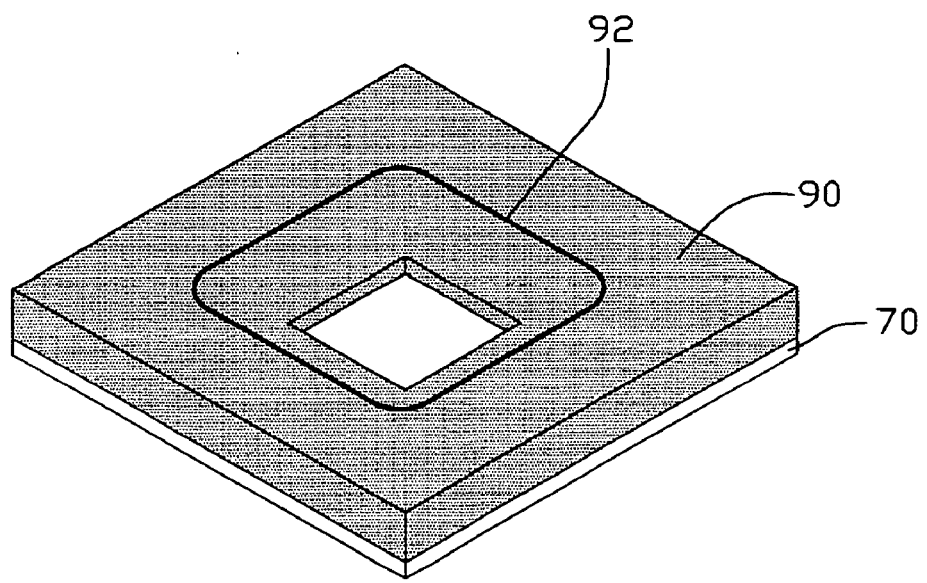
FIG. 11 is an isometric view of the substrate of FIG. 10 with the catalyst layer formed thereon.

Referring to FIGS. 10 and 11, the shadow mask layer 80 is removed from the substrate 70. A region 92 of the catalyst layer 90 is marked for purpose of determining the growth direction of carbon nanotubes. A method for defining the region 92 of the catalyst layer 90 is similar to that as the first embodiment described.

Figure 12:
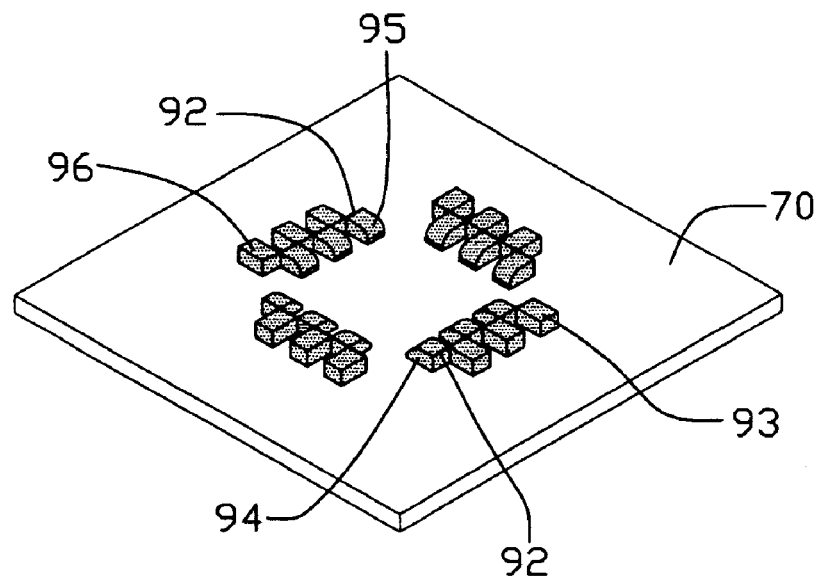
FIG. 12 is similar to FIG. 11, but showing the catalyst layer patterned into a plurality of catalyst blocks positioned at opposite sides of the region.

Referring to FIG. 12, the catalyst layer 90 can be patterned to meet the various configurations of resultant carbon nanotube-based devices. The patterned catalyst layer 90 includes at least one catalyst block having a gradient thickness. In particular, a thickness of the at least one catalyst block gradually varies from a first end thereof to an opposite second end thereof. The least one catalyst block somewhere has a thickness proximal or equal to the optimum thickness for growing carbon nanotubes.

In the illustrated embodiment, the patterned catalyst layer 90 includes a plurality of catalyst blocks 93, 94, 95, 96 each positioned at a side of the region 92. A thinnest end of each of the catalyst blocks 93, 96 has a thickness proximal or equal to the optimum thickness, and a thickest end of each of the catalyst blocks 94, 95 has a thickness proximal or equal to the optimum thickness. The pattern is defined using a photolithography process.

It is understood that, a catalyst layer having a predetermined pattern can be directly formed, without the patterning step as above-mentioned. The formation of such a catalyst layer is actually the product of a series of substeps. A shadow mask layer having a reverse pattern corresponding to the predetermined pattern is formed on the substrate 90, to define a unmasked surface area same to the predetermined pattern. After a catalyst layer sputter-deposition process similar to the process as above-mentioned being implemented, and the shadow mask layer being removed using a lift-off process, a catalyst layer having the predetermined pattern can be directly obtained.

Figure 13:
FIG. 13 is an enlarged, side view of the substrate and catalyst blocks of FIG. 12 after being annealed.
Figure 14:
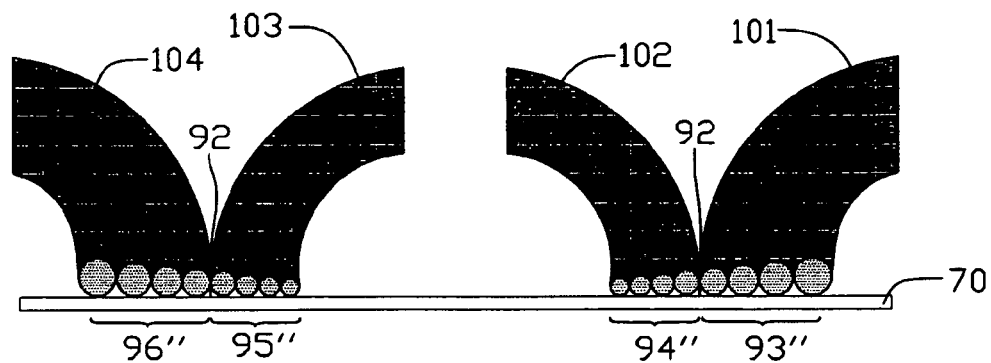
FIG. 14 is an enlarged, side view of a carbon nanotube-based device in accordance with the second embodiment, obtained by treating the catalyst blocks of the substrate of FIG. 13.

FIGS. 13-14 together illustrate successive stages in a process for forming a carbon nanotube-based device with plural orientations of carbon nanotubes based on the above-described catalyst layer 90, in accordance with the second embodiment.

Referring to FIG. 13, the substrate 70 with the catalyst blocks 93, 94, 95, 96 is annealed in an oxygen-containing environment at about 300° C., thereby oxidizing the catalyst blocks 93, 94, 95, 96 to form nano-sized catalyst oxide particles 93', 94', 95', 96'. Consequently, the thinner a portion of the catalyst blocks 93, 94, 95, 96 is, the smaller the diameters of the catalyst oxide particles 33', 34' formed from that portion are. Likewise, the thicker a portion of the catalyst blocks 93, 94, 95, 96 is, the larger the diameters of the catalyst oxide particles 93', 94', 95', 96' formed from that portion are.

Subsequently, the treated substrate 70 is placed in a furnace (not shown), a carbon source gas is introduced into the furnace, and then a chemical vapor deposition process similar to that of defining the region 92 of the catalyst layer 90 is implemented.

Referring to FIG. 14, a plurality of carbon nanotube arrays 101, 102, 103, 104 extending from the substrate 70 can be formed. During the process of growing the carbon nanotube arrays 101, 102, 103, 104, the carbon source gas is decomposed into carbon atoms and hydrogen gas in a catalytic reaction process catalyzed by the nano-sized catalyst oxide particles 93', 94', 95', 96'. Thus the catalyst oxide particles 93', 94', 95', 96' are deoxidized to catalyst particles 93", 94", 95", 96" by the hydrogen gas. Due to inherently strong Van der Waals force interactions between the carbon nanotubes, the carbon nanotubes are bundled together, and the carbon nanotube arrays 101, 102, 103, 104 extend in arc shapes bending in respective directions of deviating from the region 92.

Figure 15:
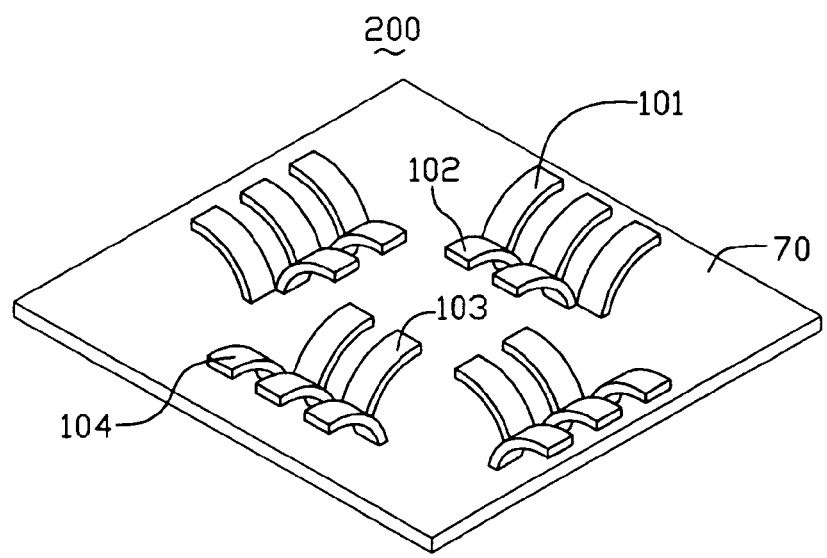
FIG. 15 is an isometric view of the carbon nanotube-based device of FIG. 14.

Referring to FIG. 15, a resultant carbon nanotube-based device 1000 with plural orientations of the carbon nanotube arrays 101, 102, 103, 104 can be formed. The carbon nanotube-based device 1000 includes the substrate 70, and a plurality of carbon nanotube arrays 101, 102, 103, 104 extending from the catalyst layer 90 (as shown in FIG. 14), supported by the substrate 70. The carbon nanotube arrays 101, 102, 103, 104 are arc-shaped, and bend in respective directions deviating from the region 92. In the illustrated embodiment, because the catalyst layer 90 formed around the shadow mask layer 80, so all the carbon nanotube arrays 101, 102, 103, 104 of the carbon nanotube-based device 1000 totally can extend along four different directions (as shown in FIG. 15).

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A method for making a carbon nanotube-based device, the method comprising the steps of:

providing a substrate having a shadow mask layer formed thereon, the shadow mask layer being configured for defining an unmasked surface area on the substrate;

disposing a sputter source on the shadow mask layer, the sputter source being configured for supplying a catalyst material and depositing the catalyst material onto the substrate;

forming a catalyst layer comprising at least one catalyst block on the unmasked surface area of the substrate, a thickness of the at least one catalyst block being gradually decreased from a first end thereof to an opposite second end thereof; the at least one catalyst block having a region with a thickness proximal or equal to an optimum thickness at which carbon nanotubes grow the fastest, a thicker region having a thickness that is thicker than the optimum thickness, and a thinner region having a thickness that is thinner than the optimum thickness, such that the carbon nanotubes in the thicker and thinner regions grow slower than the carbon nanotubes at the region;

introducing a carbon source gas; and forming at least one carbon nanotube array extending from the catalyst layer using a chemical vapor deposition process, wherein the at least one carbon nanotube array comprises two arc-shaped sections, wherein each arc-shaped section bends in a direction deviating from the region.

2. The method of claim 1, wherein the step of forming the catalyst layer comprising the sub-steps of:

sputter-depositing a catalyst material on the substrate to form an initial catalyst layer;

removing the shadow mask layer from the substrate; and patterning the initial catalyst layer to form the catalyst layer.

3. The method of claim 2, further comprising a step of marking the region of the initial catalyst layer, before patterning the initial catalyst layer.

4. The method of claim 2, wherein the sputter source comprising a sputter target made from the catalyst material, the sputter target being selected from the group consisting of a surface sputter target and a linear sputter target.

5. The method of claim 2, wherein the catalyst material is selected from the group consisting of iron, cobalt, nickel, and alloys thereof.

6. The method of claim 2, wherein the shadow mask layer has a plurality of sidewalls substantially perpendicular to the substrate.

7. The method of claim 6, wherein the catalyst layer is formed around the shadow mask layer.

8. The method of claim 2, wherein a thickness of a position of the initial catalyst layer distant from the shadow mask layer with a distance of λ satisfies the condition:

$$T(\lambda)=T_0/2\times(1+\lambda/\sqrt{\lambda^2+h^2})$$

where, the T(λ) is a thickness of the position of the initial catalyst layer distant from the shadow mask layer with a distance of λ, $T_0$ is a thickness of the position under a situation that no shadow mask layer formed on the substrate during the sputter-deposition process; h is a height of the shadow mask layer.

9. The method of claim 2, wherein the step of patterning the initial catalyst layer to form the catalyst layer further comprises patterning the initial catalyst layer to form a plurality of first catalyst blocks and second catalyst blocks, a thinnest end of the first catalyst blocks comprises of a thickness approximately equal to the optimum thickness, and a thickest end of the second catalyst blocks comprises of a thickness approximately equal to the optimum thickness.

10. The method of claim 9, wherein the plurality of first catalyst blocks and second catalyst blocks is patterned to be staggeringly positioned at opposite sides of the region with the thickness proximal or equal to the optimum thickness.

11. The method of the claim 1, wherein a thickness of the first end of the at least one catalyst block is in the range from 5 to 20 nanometers; a thickness of the second end of the at least one catalyst block is in the range from 1 to 10 nanometers.

12. The method of claim 1, wherein the step of forming the catalyst layer comprising the sub-steps of:

sputter-depositing a catalyst material on the substrate to form the catalyst layer; and removing the shadow mask layer from the substrate.

13. The method of claim 1, further comprising a step of annealing the substrate with the catalyst layer in an oxygen-containing environment to form nano-sized catalyst oxide particles before introducing the carbon source gas.

14. The method of claim 1, wherein the substrate is made from a material selected from the group consisting of silicon, glass, and metal.

15. The method of claim 1, wherein the step of forming at least one carbon nanotube array extending from the catalyst layer using a chemical vapor deposition process further comprises forming at least two carbon nanotube arrays bending in two different directions of deviating from the region.

16. The method of claim 1, wherein a height of the shadow mask layer is less than mean free path of a catalyst atom generated from the sputter source under a predetermined sputter-deposition process, wherein the mean free path S of a catalyst atom satisfies the condition:

$$S = \frac{kT}{\sqrt{2}\,\pi d^2 p}$$

where d is a diameter of the catalyst atom, p is an operating pressure of the sputter-deposition process, k is the Boltzmann constant ($1.38066\times10^{-23}$ J/K (Joule per Kelvin)), T is an operating absolute temperature of the sputter-deposition process.

17. The method of claim 1, wherein a distance from the sputter source to the substrate is greater than the mean free path of the catalyst atom generated from the sputter source under the predetermined sputter-deposition process.

18. The method of claim 1, wherein the catalyst material is iron, the carbon source gas is ethylene, a temperature at which the carbon nanotubes are grown is about 700° C., the optimum thickness of the catalyst layer is about 5 nanometers.

19. A method for making a carbon nanotube-based device, the method comprising the steps of:

forming a catalyst layer comprising a gradient thickness being gradually decreased from a first end of the catalyst layer to an opposite second end of the catalyst layer, wherein the catalyst layer comprises a region with a thickness proximal or equal to an optimum thickness at which carbon nanotubes grow fastest;

patterning the catalyst layer to form a plurality of first catalyst blocks and second catalyst blocks staggeringly positioned at opposite sides of the region with the thickness proximal or equal to the optimum thickness, wherein a thinnest end of the first catalyst blocks comprises of a thickness approximately equal to the optimum thickness, and a thickest end of the second catalyst blocks comprises of a thickness approximately equal to the optimum thickness;

introducing a carbon source gas; and forming a plurality of carbon nanotube arrays extending from the first catalyst blocks and second catalyst blocks using a chemical vapor deposition process, wherein the carbon nanotube arrays extending from the first catalyst blocks bend toward a thickest end of the first catalyst blocks, and the carbon nanotube arrays extending from the second catalyst blocks bend toward a thinnest end of the second catalyst blocks.

* * * * *